US010541881B2

(12) United States Patent
Taylor et al.

(10) Patent No.: US 10,541,881 B2
(45) Date of Patent: Jan. 21, 2020

(54) AUTOMATED NETWORK SUPERVISION INCLUDING DETECTING AN ANONYMOUSLY ADMINISTERED NODE, IDENTIFYING THE ADMINISTRATOR OF THE ANONYMOUSLY ADMINISTERED NODE, AND REGISTERING THE ADMINISTRATOR AND THE ANONYMOUSLY ADMINISTERED NODE

(71) Applicant: Disney Enterprises, Inc., Burbank, CA (US)

(72) Inventors: Glen Taylor, Orlando, FL (US); Gregory Wood, Sammamish, WA (US); Donald Clark, Ventura, CA (US)

(73) Assignee: Disney Enterprises, Inc., Burbank, CA (US)

( * ) Notice: Subject to any disclaimer, the term of this patent is extended or adjusted under 35 U.S.C. 154(b) by 231 days.

(21) Appl. No.: 15/842,679

(22) Filed: Dec. 14, 2017

(65) Prior Publication Data

US 2019/0190793 A1     Jun. 20, 2019

(51) Int. Cl.
*H04L 12/24* (2006.01)
*G06N 20/00* (2019.01)
*H04L 29/08* (2006.01)

(52) U.S. Cl.
CPC ............ *H04L 41/16* (2013.01); *G06N 20/00* (2019.01); *H04L 41/20* (2013.01); *H04L 67/10* (2013.01)

(58) Field of Classification Search
CPC ......... H04L 41/16; H04L 67/10; H04L 41/20; G06N 20/00
See application file for complete search history.

(56) References Cited

U.S. PATENT DOCUMENTS

| 5,848,396 | A  | * | 12/1998 | Gerace      | G06Q 30/02 705/7.33 |
| 7,448,073 | B2 | * | 11/2008 | Rosenberger | H04L 43/00 726/4 |
| 7,698,422 | B2 | * | 4/2010  | Vanderhook  | G06Q 30/02 709/224 |
| 8,020,195 | B2 | * | 9/2011  | Frost       | H04L 63/0407 709/227 |
| 9,104,858 | B1 | * | 8/2015  | Sundaram    | G06F 21/6218 |

(Continued)

*Primary Examiner* — Daniel C. Murray
(74) *Attorney, Agent, or Firm* — Farjami & Farjami LLP

(57) ABSTRACT

According to one implementation, a network supervision system includes one or more computing platform(s) coupled to multiple nodes of a network including the computing platform(s), the computing platform(s) including a hardware processor and a system memory storing a network participant supervising software code and a network participant registry. The hardware processor executes the network participant supervising software code to detect an anonymously administered node of the network, aggregate system log files of the anonymously administered node, and perform an analysis of the system log files using an unsupervised machine learning algorithm to identify an administrator of the anonymously administered node. The hardware processor further executes the network participant supervising software code to generate a registration record associating the administrator with the anonymously administered node, and update the network participant registry using the registration record.

20 Claims, 4 Drawing Sheets

(56) References Cited

U.S. PATENT DOCUMENTS

| | | | |
|---|---|---|---|
| 9,332,042 B2* | 5/2016 | Bruich | H04L 65/40 |
| 9,355,155 B1* | 5/2016 | Cassel | G06F 16/93 |
| 9,413,833 B2* | 8/2016 | Abuelsaad | H04L 67/10 |
| 9,516,053 B1* | 12/2016 | Muddu | G06F 3/0482 |
| 9,781,220 B2* | 10/2017 | Abuelsaad | H04L 67/10 |
| 9,824,199 B2* | 11/2017 | Kshirsagar | G06F 21/316 |
| 10,387,882 B2* | 8/2019 | Hagen | G06F 16/215 |
| 10,389,738 B2* | 8/2019 | Muddu | G06N 20/00 |
| 10,419,450 B2* | 9/2019 | Muddu | G06N 5/022 |
| 10,419,462 B2* | 9/2019 | Muddu | G06K 9/2063 |
| 10,419,463 B2* | 9/2019 | Muddu | H04L 63/1441 |
| 10,419,465 B2* | 9/2019 | Muddu | G06F 3/04847 |
| 2005/0166065 A1* | 7/2005 | Eytchison | H04L 63/08 713/189 |
| 2007/0106626 A1* | 5/2007 | Mundie | G06Q 50/24 706/20 |
| 2007/0112597 A1* | 5/2007 | Heckerman | G06Q 30/0207 705/2 |
| 2007/0112598 A1* | 5/2007 | Heckerman | G06Q 50/22 705/2 |
| 2007/0294747 A1* | 12/2007 | Rosenberger | H04L 43/00 726/4 |
| 2008/0262920 A1* | 10/2008 | O'Neill | G06Q 30/02 705/14.27 |
| 2009/0070443 A1* | 3/2009 | Vanderhook | G06Q 30/02 709/222 |
| 2009/0171759 A1* | 7/2009 | McGeehan | G06Q 30/02 705/35 |
| 2009/0239467 A1* | 9/2009 | Gulin | G08B 5/36 455/41.2 |
| 2009/0300152 A1* | 12/2009 | Ferris | G06F 9/5072 709/223 |
| 2010/0082605 A1* | 4/2010 | Dupret | G06N 20/00 707/722 |
| 2011/0082824 A1* | 4/2011 | Allison | G06Q 10/063 706/20 |
| 2013/0054433 A1* | 2/2013 | Giard | H04L 67/22 705/34 |
| 2013/0055367 A1* | 2/2013 | Kshirsagar | G06F 21/316 726/6 |
| 2013/0102283 A1* | 4/2013 | Lau | H04W 12/06 455/411 |
| 2014/0075004 A1* | 3/2014 | Van Dusen | H04L 41/04 709/223 |
| 2014/0207518 A1* | 7/2014 | Kannan | G06Q 30/0201 705/7.29 |
| 2014/0279299 A1* | 9/2014 | Erenrich | G06Q 40/10 705/30 |
| 2014/0280592 A1* | 9/2014 | Zafarani | H04L 67/22 709/204 |
| 2014/0317263 A1* | 10/2014 | Abuelsaad | H04L 67/10 709/224 |
| 2014/0365408 A1* | 12/2014 | Snyder | G06F 19/00 706/12 |
| 2014/0379424 A1* | 12/2014 | Shroff | G06Q 30/0204 705/7.31 |
| 2015/0237039 A1* | 8/2015 | Grajek | H04L 63/0815 726/8 |
| 2015/0287091 A1* | 10/2015 | Koran | G06Q 30/0277 705/14.66 |
| 2015/0378587 A1* | 12/2015 | Falaki | H04L 67/02 715/747 |
| 2017/0004487 A1* | 1/2017 | Hagen | G06Q 20/4016 |
| 2017/0063900 A1* | 3/2017 | Muddu | G06F 3/04842 |
| 2017/0185899 A1* | 6/2017 | Chawla | G06N 20/00 |
| 2017/0185918 A1* | 6/2017 | Chawla | G06N 5/043 |
| 2017/0293850 A1* | 10/2017 | Chawla | G06Q 10/08 |
| 2017/0293851 A1* | 10/2017 | Chawla | G06Q 10/08 |
| 2018/0039770 A1* | 2/2018 | Kshirsagar | G06F 21/316 |
| 2018/0197107 A1* | 7/2018 | Belous | G06N 5/022 |
| 2019/0020676 A1* | 1/2019 | Laughlin | H04L 63/1416 |
| 2019/0149626 A1* | 5/2019 | Shah | G06N 20/00 706/12 |
| 2019/0259045 A1* | 8/2019 | Bower | G06N 20/00 |

* cited by examiner

AUTOMATED NETWORK SUPERVISION INCLUDING DETECTING AN ANONYMOUSLY ADMINISTERED NODE, IDENTIFYING THE ADMINISTRATOR OF THE ANONYMOUSLY ADMINISTERED NODE, AND REGISTERING THE ADMINISTRATOR AND THE ANONYMOUSLY ADMINISTERED NODE

BACKGROUND

A large organization, such as a government entity, large corporation, or university, for example may utilize a communication network having thousands or hundreds of thousands of technology nodes. Each of those nodes may correspond to a technology device, such as a personal communication device or client computer system, for example, or to a software application used across the network. In such a la use environment, identification of the owner or administrator of each technology device and software application can be important for effective management of the network.

Conventional solutions for managing an organizational network tend to rely on pre-registration of network device or application owners and administrators, or seek to identify a network connected device or application directly. The process for identifying a technology device or application according to the conventional approach often includes a relatively costly and inconvenient manual investigation to identify its owner or administrator.

SUMMARY

There are provided automated network supervision systems and methods for use by such systems, substantially as shown in and/or described in connection with at least one of the figures, and as set forth more completely in the claims.

DETAILED DESCRIPTION

Figure 1:
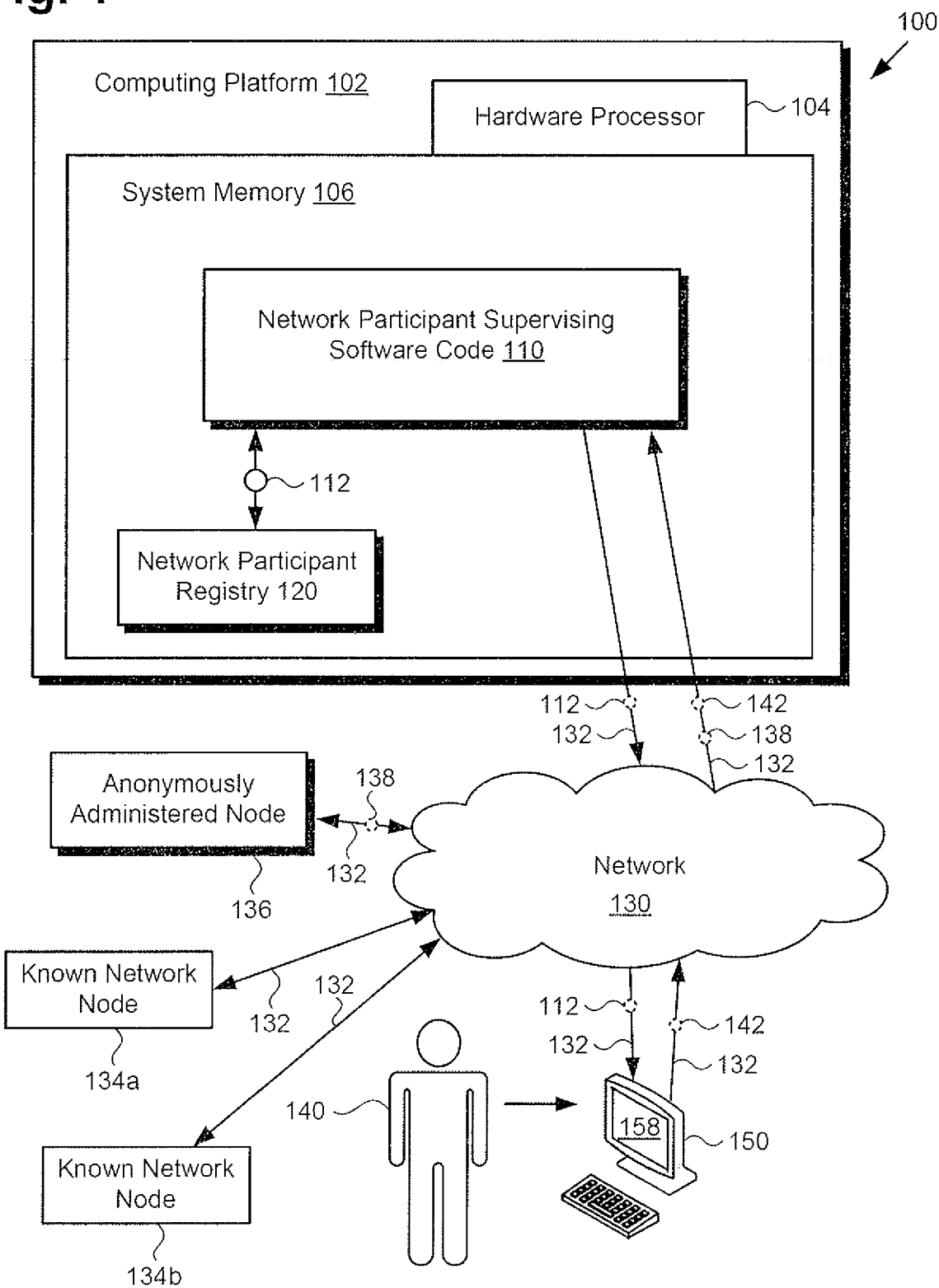
FIG. 1 shows a diagram of an exemplary automated network supervision system, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As stated above, a large organization, such as a government entity, large corporation, or university, for example may utilize a communication network having thousands or hundreds of thousands of technology nodes. Each of those nodes may correspond to a technology device, such as a personal communication device or client computer system, for example, or to a software application used across the network. In such a use environment, identification of the owner or administrator of each technology device and software application can be important for effective management of the network.

As also stated above, conventional solutions for managing an organizational network tend to rely on pre-registration of network device or application owners and administrators, or seek to identify a network connected device or application directly. The process for identifying a technology device or application according to the conventional approach often includes a relatively costly and inconvenient manual investigation to identify its owner or administrator.

The present application discloses a network supervision solution that overcomes the drawbacks and deficiencies in the conventional art. The present network supervision solution is an automated solution that detects an anonymously administered node of a supervised network and aggregates system log files of the anonymously administered node. By performing an analysis of the system log files using an unsupervised machine learning algorithm, the present solution advantageously enables identification of the administrator of the previously anonymously administered network node without requiring a manual investigation. The present network supervision solution then generates a registration record associating the administrator with the previously anonymously administered node and automatically updates a network participant registry using the registration record. The disclosed solution herein is able to identify anonymously administered nodes on the network, and use unsupervised learning, based on the logs, to identify the administer.

FIG. 1 shows a diagram of an exemplary automated network supervision system, according to one implementation. As shown in FIG. 1, network supervision system 100 includes computing platform 102 having hardware processor 104, and system memory 106 implemented as a non-transitory storage device. According to the present exemplary implementation, system memory 106 stores network participant supervising software code 110 and network participant registry 120.

As further shown in FIG. 1, network supervision system 100 is implemented within a use environment including network 130 having network communication links 132, known network nodes 134a and 134b, and anonymously administered node 136, as well as user device 150 including display 158. It is noted that computing platform 102 of network supervision system 100 and user device 150 may be other known network nodes of network 130. Also shown in FIG. 1 are user 140 of user device 150, detection data 142, system log files 138 of anonymously administered node 136, and registration record 112 for anonymously administered node 136 produced using network participant supervising software code 110.

It is noted that although FIG. 1 depicts network participant supervising software code 110 as being stored in its entirety in memory 106, that representation is merely provided as an aid to conceptual clarity. More generally, network supervision system 100 may include one or more computing platforms corresponding to computing platform 102, such as computer servers for example, which may be co-located, or may form an interactively linked but distributed system, such as a cloud based system, for instance.

As a result, hardware processor 104 and system memory 106 may correspond to distributed processor and memory resources within network supervision system 100. Thus, it is to be understood that various portions of network participant supervising software code 110, such as one or more of the modules described below by reference to FIG. 4, may be stored and/or executed using the distributed memory and/or processor resources of network supervision system 100.

In some implementations, computing platform 102 of network supervision system 100 may correspond to one or more web servers, accessible over a packet-switched network such as the Internet, for example. Alternatively, computing platform 102 of network supervision system 100 may correspond to one or more computer servers supporting a local area network (LAN), or included in another type of private communication network. That is to say, in some implementations, network 130 may be a private network.

Known network nodes 134*a* and 134*b*, and anonymously administered node 136 may correspond to client systems of network 130. Examples of such client systems include a variety of hardware including computer work stations, portable computing devices, mobile communication devices, switches, routers, repeaters, and the like. Alternatively, or in addition, one or more of known network nodes 134*a* and 134*b*, and/or anonymously administered node 136 take the form of a network interface of a software application utilized on network 130.

Although user device 150 is shown as a desktop computer in FIG. 1, that representation is also provided merely as an example. More generally, user device 150 may be any suitable mobile or stationary computing device or system that implements data processing capabilities sufficient to provide a user interface, support connections to network 130, and implement the functionality ascribed to user device 150 herein. For example, in other implementations, user device 150 may take the form of a laptop computer, tablet computer, or smartphone, for example.

User 140, who may be a security officer or administrator of network 130, for example, may utilize user device 150 to interact with network supervision system 100. In some implementations, for example, user 140 may provide detection data 142 for facilitating detection of the presence of anonymously administered node 136 on network 130 by network participant supervising software code 110.

It is noted that, in various implementations, registration record 112 for anonymously administered node 136, when generated using network participant supervising software code 110, may be stored in network participation registry 120 and/or may be copied to non-volatile storage (not shown in FIG. 1). Alternatively, or in addition, as shown in FIG. 1, in some implementations, registration record 112 for anonymously administered node 136 may be sent to user device 150 for storage, and or display to user 140 by display 158. It is further noted that display 158 may take the form of a liquid crystal display (LCD), a light-emitting diode (LED) display, an organic light-emitting diode (OLED) display, or another suitable display screen that performs a physical transformation of signals to light.

Figure 2:
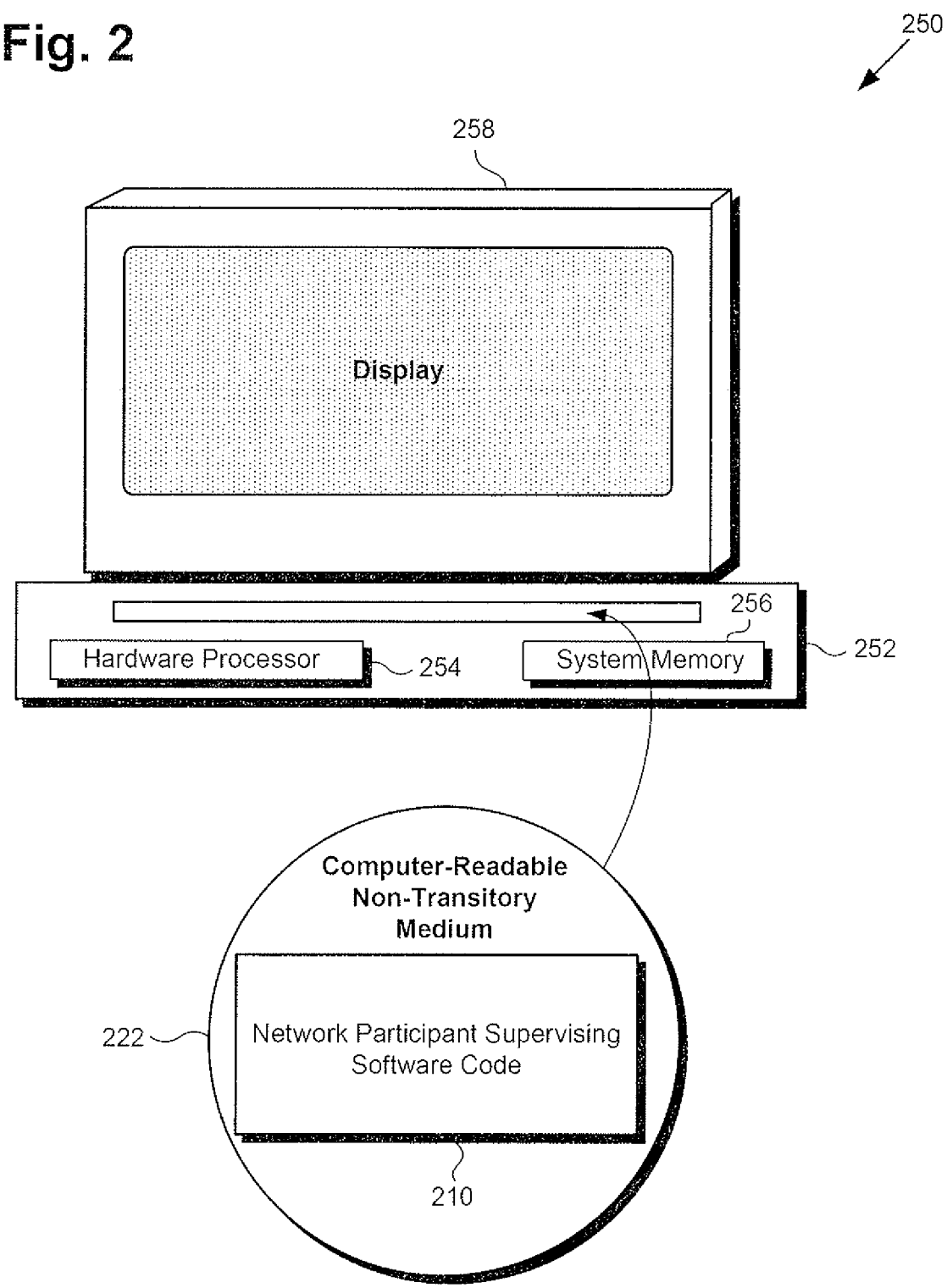
FIG. 2 shows an exemplary system and a computer-readable non-transitory medium including instructions for performing automated network supervision, according to one implementation.

FIG. 2 shows exemplary system 250 and computer-readable non-transitory medium 222 including instructions for performing automated network supervision, according to one implementation. System 250 includes computing platform 252 having hardware processor 254 and system memory 256, interactively linked to display 258. Display 258 may take the form of an LCD, LED display, an OLED display, or another suitable display screen that performs a physical transformation of signals to light. System 250 including computing platform 252 having hardware processor 254 and system memory 256 corresponds in general to network supervision system 100 including computing platform 102 having hardware processor 104 and system memory 106, in FIG. 1. Consequently, system 250 may share any of the characteristics attributed to corresponding network supervision system 100 by the present disclosure.

Also shown in FIG. 2 is computer-readable non-transitory medium 222 having network participant supervising software code 210 stored thereon. The expression "computer-readable non-transitory medium," as used in the present application, refers to any medium, excluding a carrier wave or other transitory signal, that provides instructions to hardware processor 254 of computing platform 252. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

According to the implementation shown in FIG. 2, computer-readable non-transitory medium 222 provides network participant supervising software code 210 for execution by hardware processor 254 of computing platform 252. Network participant supervising software code 210 corresponds in general to network participant supervising software code 110, in FIG. 1, and is capable of performing all of the operations attributed to that corresponding feature by the present disclosure.

Figure 3:
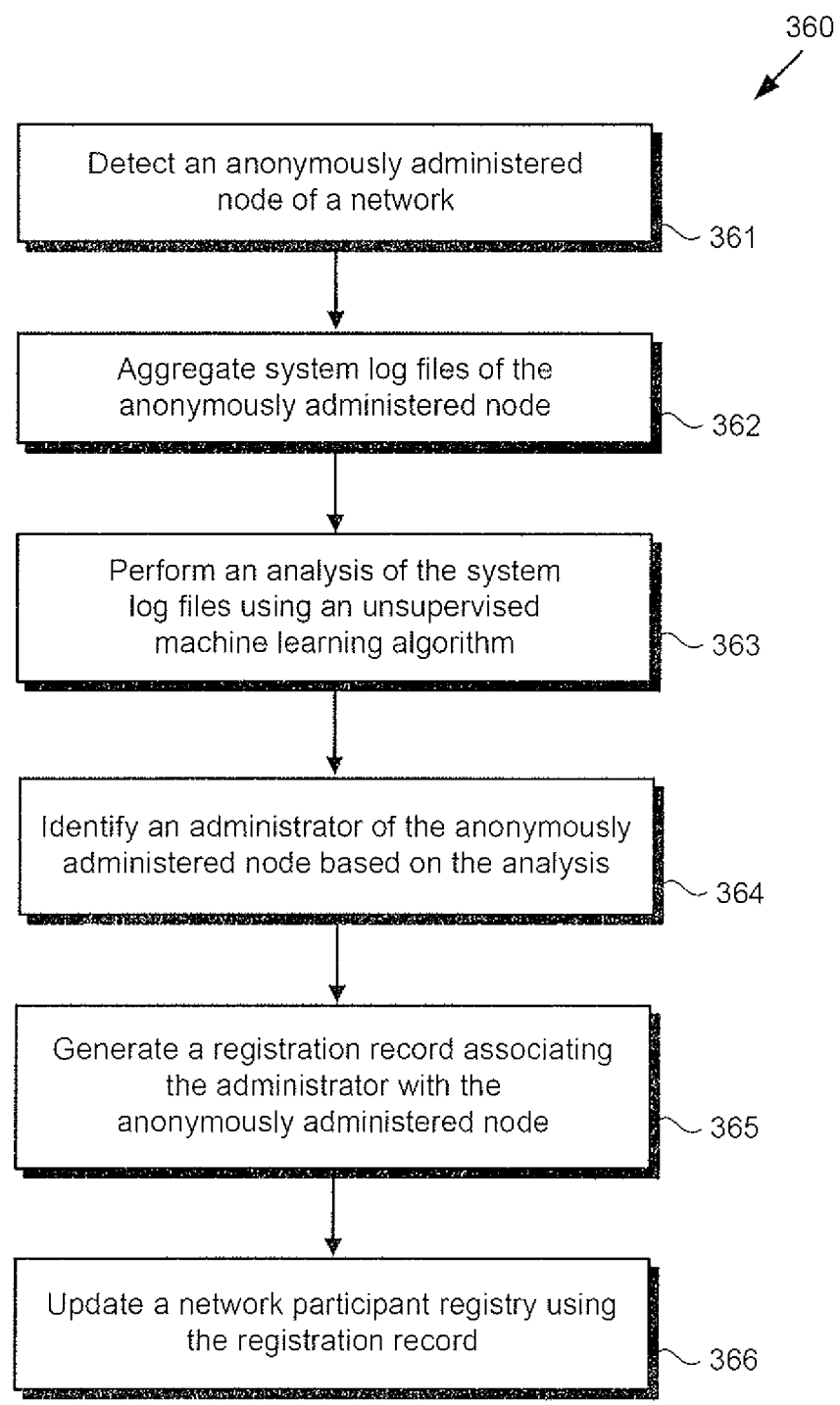
FIG. 3 shows a flowchart presenting an exemplary method for performing automated network supervision, according to one implementation.

The functionality of network participant supervising software code 110/210 will be further described by reference to FIG. 3 in combination with FIGS. 1, 2, and 4. FIG. 3 shows flowchart 360 presenting an exemplary method for use by a system, such as network supervision system 100, in FIG. 1, or system 250, in FIG. 2, for performing automated network supervision. With respect to the method outlined in FIG. 3, it is noted that certain details and features have been left out of flowchart 360 in order not to obscure the discussion of the inventive features in the present application.

Figure 4:
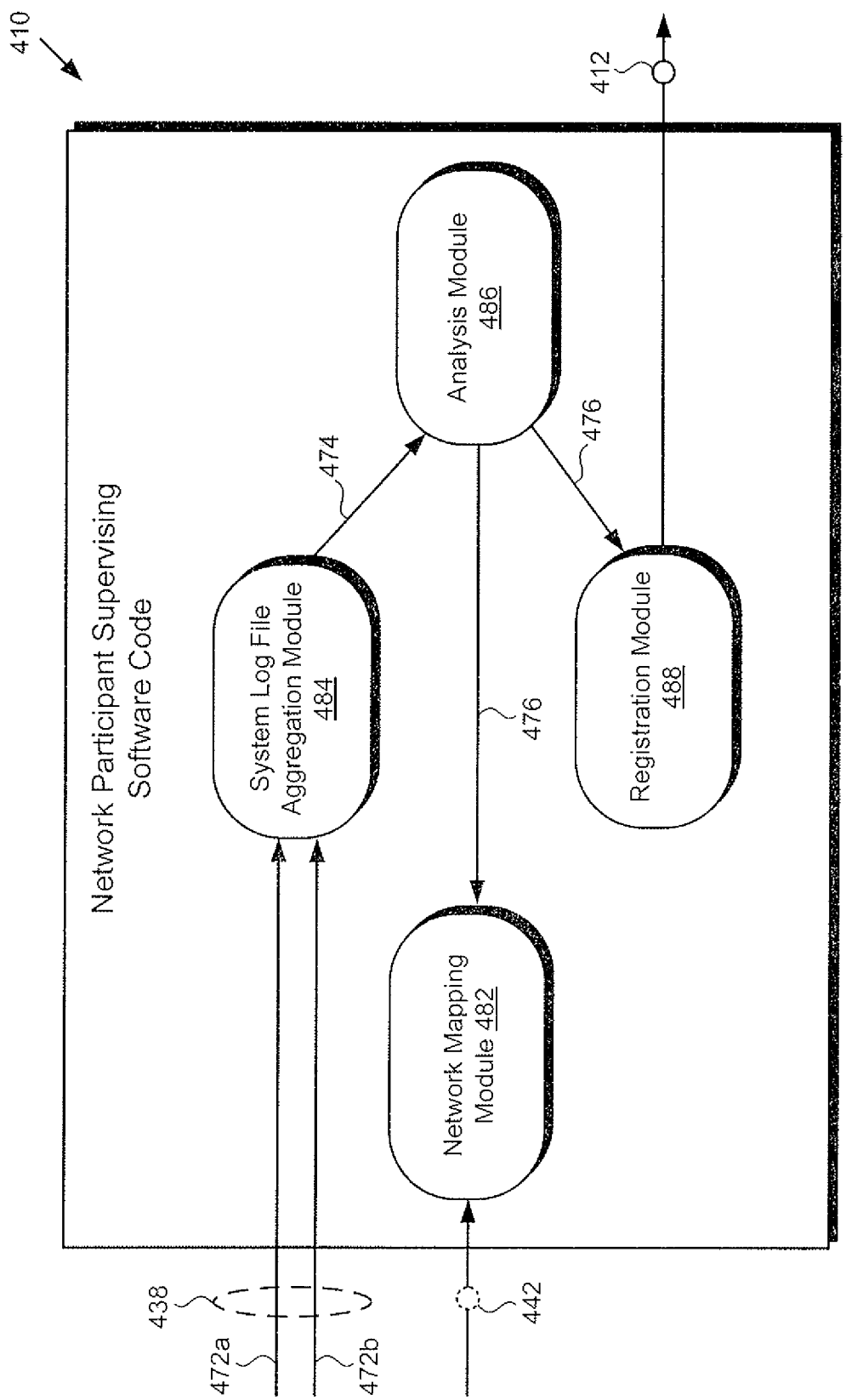
FIG. 4 shows an exemplary diagram of a network participant supervising software code suitable for execution by a hardware processor of the systems shown by FIGS. 1 and 2, according to one implementation.

FIG. 4 shows exemplary network participant supervising software code 410 suitable for execution by hardware processor 104/254 of the respective systems shown by FIGS. 1 and 2, according to one implementation. As shown in FIG. 4, network participant supervising software code 410 may include network mapping module 482, system log file aggregation module 484, analysis module 486, and registration module 488. Also shown in FIG. 4 are detection data 442, system log files 438 including individual system log files 472*a* and 472*b*, aggregated system log file data 474, identification data 476 identifying the administrator of anonymously administered node 136, and registration record 412 for anonymously administered node 136.

Detection data 442, system log files 438, and registration record 412 correspond respectively in general to detection data 142, system log files 138, and registration record 112, in FIG. 1, and may share any of the characteristics attributed to those corresponding features by the present disclosure. Moreover, network participant supervising software code 410 corresponds in general to network participant supervising software code 110/210, in FIGS. 1 and 2, and those corresponding features may share the characteristics attributed to any corresponding feature by the present disclosure. Thus, like network participant supervising software code 410, network participant supervising software code 110/210 may include modules corresponding to network mapping module 482, system log file aggregation module 484, analysis module 486, and registration module 488.

Referring now to FIG. 3 in combination with FIGS. 1, 2, and 4, flowchart 360 begins with detecting anonymously administered node 136 of network 130 (action 361). Anonymously administered node 136 of network 130 may be detected by network participant supervising software code 110/210/410 of network supervision system 100, executed by hardware processor 104/254.

Anonymously administered node 136 of network 130 may be detected by network supervision system 100 in a number of ways. In some implementations, detection of anonymously administered node 136 may be performed as an automated process by network supervision system 100. For example, in those implementations, network supervision system 100 may automatically poll or probe network 130 for the presence of anonymously administered node 136. In one such implementation, for example, network participant supervising software code 110/210/410, executed by hardware processor 104/254 may utilize network mapping module 482 to compare anonymously administered node 136 with registration records for known network nodes stored in network participant registry 120.

Alternatively, or in addition, network supervision system 100 may detect anonymously administered node 136 based on detection data 142/442 received from user 140. As noted above, user 140 may be a security officer or administrator of network 130 and may detect the presence of anonymously administered node 136 in the course performing network maintenance or supervision. Detection data 142/442 may be received by network mapping module 482 of network participant supervising software code 110/210/410 and may be used to reference registration records stored in network participant registry. For example, network mapping module 482 may be used by network participant supervising software code 110/210/410 to reference network participation registry to identify the administrator of anonymously administered network node 136, or to confirm that the administrator of anonymously administered node 136 is presently unknown.

Flowchart 360 continues with aggregating system log files 138/438 of anonymously administered node 136 (action 362). System log files 138/438 may include any data typically stored as system log data, as known in the art. For example, system log files 138/438 may comply with the RFC5424 Syslog protocol, which is hereby incorporated fully by reference into the present application.

Aggregation of system log files 138/438 of anonymously administered node 136 may be performed by network participant supervising software code 110/210/410, executed by hardware processor 104/254, and using system log aggregation module 484. The aggregation of system log files 138/438 by system log aggregation module 484 of participant supervising software code 110/210/410 may be performed via communication network 130. In one implementation, the aggregation of system log files 138/438 may include receiving system log files 138/438 in one or more data dump(s) obtained from anonymously administered node 136. However, in other implementations, the aggregation of system log files 138/438 may be a gradual process in which system log aggregation module 484 of participant supervising software code 110/210/410 collects system log files 138/438 from anonymously administered node 136 over time.

Flowchart 360 continues with performing an analysis of system log files 138/438 using an unsupervised machine learning algorithm (action 363). As shown in FIG. 4, in one implementation, network participant supervising software code 110/210/410, executed by hardware processor 104/254, may utilize analysis module 486 to analyze system log files 138/438 based on aggregated system log file data 474 received from system log aggregation module 484.

Analysis module 486 may execute one or more unsupervised machine learning algorithms to perform the analysis based on aggregated system log file data 484. For example, in one implementation, analysis module 486 of network participant supervising software code 110/210/410 may rely on one of cluster analysis, or application of a radial basis function network for the analysis of aggregated system log file data 474. Alternatively, or in addition, analysis module 486 of network participant supervising software code 110/210/410 may utilize an expectation-maximization (EM) algorithm, either alone, or in combination with a generative topographic map (GTM) to analyze aggregated system log file data 474. It is noted that cluster analysis, application of a radial basis function network, the EM algorithm and GTM are merely a few exemplary unsupervised machine learning techniques suitable for use by analysis module 486 of network participant supervising software code 110/210/410.

Flowchart 360 continues with identifying the administrator of anonymously administered node 136 based on the analysis performed in action 363 (action 364). Identification of the administrator of anonymously administered node 136 may be performed by network participant supervising software code 110/210/410, executed by hardware processor 104/254, and also using analysis module 486.

The analysis of aggregated system log file data 474 performed in action 463 may reveal characteristics of anonymously administered node 136 that are shared in common with other known network nodes of network 130, such as one or more of known network nodes 134a and 134b. For example, analysis of aggregated system log file data 474 may reveal that anonymously administered node 136 routinely runs a software application that is also run by other known network nodes administered by a single organization, such as a corporate subdivision or subsidiary. Alternatively, or in addition, analysis of aggregated system log file data 474 may reveal that anonymously administered node 136 is consistently accessed by a user who logs on to anonymously administered system node 136 with a user identification (user ID) or department ID that can be identified, for example, by reference to network participant registry 120.

Thus, in various implementations, the administrator of anonymously administered network node 136 may be identified as one of a specific organization having control over anonymously administered node 136, a department within the organization, or an individual person using anonymously administered network node 136. Identification of the administrator of anonymously administered network node 136 in action 364 results in generation of identification data 476 by analysis module 486 of network participant supervising software code 110/210/410. As shown in FIG. 4, identification data 476 is provided as an output by analysis module 486 to update network mapping module 482, as well as for use by registration module 488.

Flowchart 360 continues with generating registration record 112/412 associating the administrator identified in action 364 with anonymously administered node 136 (action 365). Registration record 112/412 may include substantially all data required to produce or update an entry in network participant registry 120. For example, registration record 112/412 may include a network address of anonymously administered network node 136 on network 130, and data and/or resource accessing rights and constraints of anonymously administered network node 136, as well as identifying the administrator of anonymously administered network node 136. Generation of registration record 112/412 may be performed by network participant supervising software code 110/210/410, executed by hardware processor 104/254, and using registration module 488.

Flowchart 360 can conclude with updating network participant registry 120 using registration record 112/412 (action 366). Updating of network participant registry 120 using registration record 112/412 may be performed by network participant supervising software code 110/210/410, executed by hardware processor 104/254. In addition to its use for updating network participant registry 120, in some implementations, registration record 112/412 for anonymously administered node 136 may be sent to user device 150 or system 250 for storage, and or display to user 140 by display 158/258.

As a result of actions 361, 362, 363, 364, 365, and 366 (hereinafter "actions 361-366"), which may be performed in an automated process by network supervision system 100, the administrator of anonymously administered node 136 is identified and included in network participant registry 120. Consequently, anonymously administered network node 136 advantageously becomes another known network node of network 130. Actions 361-366 may be repeated in each instance in which an anonymously administered node of network 130 is detected, thereby advantageously providing a robust automated network supervision solution.

Thus, the present application discloses an automated network supervision solution. The present network supervision solution detects an anonymously administered node of a supervised network and aggregates system log files of the anonymously administered node. By performing an analysis of the system log files using an unsupervised machine learning algorithm, the present solution advantageously enables identification of the administrator of the previously anonymously administered network node without requiring a manual investigation. The present network supervision solution then generates a registration record associating the administrator with the previously anonymously administered node and automatically updates a network participant registry using the registration record.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A network supervision system comprising:
    at least one computing platform coupled to a plurality of nodes of a network including the at least one computing platform, the at least one computing platform including a hardware processor and a system memory storing a network participant supervising software code and a network participant registry;
    the hardware processor configured to execute the network participant supervising software code to:
        detect an anonymously administered node of the network;
        aggregate a plurality of system log files of the anonymously administered node;
        perform an analysis of the plurality of system log files using an unsupervised machine learning algorithm;
        identify an administrator of the anonymously administered node based on the analysis;
        generate a registration record associating the administrator with the anonymously administered node; and
        update the network participant registry using the registration record.

2. The network supervision system of claim 1, wherein the administrator is identified as at least one of an organization having control over the anonymously administered node and a department within the organization.

3. The network supervision system of claim 1, wherein the administrator is identified as an individual person using the anonymously administered node.

4. The network supervision system of claim 1, wherein the anonymously administered node comprises a client system of the network.

5. The network supervision system of claim 4, wherein the anonymously administered node comprises a network interface of a software application.

6. The network supervision system of claim 1, wherein the network is a private network.

7. The network supervision system of claim 1, wherein the network supervision system comprises a cloud based, distributed system.

8. A method for use by a network supervision system including at least one computing platform coupled to a plurality of nodes of a network including the at least one computing platform, the at least one computing platform including a hardware processor and a system memory storing a network participant supervising software code and a network participant registry, the method comprising:
    detecting, using the hardware processor, an anonymously administered node of the network;
    aggregating, using the hardware processor, a plurality of system log files of the anonymously administered node;
    performing an analysis of the plurality of system log files, using the hardware processor and an unsupervised machine learning algorithm;
    identifying, using the hardware processor, an administrator of the anonymously administered node based on the analysis;
    generating, using the hardware processor, a registration record associating the administrator with the anonymously administered node; and
    updating, using the hardware processor, the network participant registry using the registration record.

9. The method of claim 8, wherein the administrator is identified as at least one of an organization having control over the anonymously administered node and a department within the organization.

10. The method of claim 8, wherein the administrator is identified as an individual person using the anonymously administered node.

11. The method of claim 8, wherein the anonymously administered node comprises a client system of the network.

12. The method of claim 8, wherein the anonymously administered node comprises a network interface of a software application.

13. The method of claim 8, wherein the network is a private network.

14. The method of claim 8, wherein the network supervision system comprises a cloud based, distributed system.

15. A computer-readable non-transitory medium having stored thereon instructions, which when executed by a hardware processor of a computing platform interactively coupled to a network, instantiate a method comprising:
   detecting an anonymously administered node of the network;
   aggregating a plurality of system log files of the anonymously administered node;
   performing an analysis of the plurality of system log files using an unsupervised machine learning algorithm;
   identifying an administrator of the anonymously administered node based on the analysis;
   generating a registration record associating the administrator with the anonymously administered node; and
   updating a network participant registry using the registration record.

16. The computer-readable non-transitory medium of claim 15, wherein the administrator is identified as at least one of an organization having control over the anonymously administered node and a department within the organization.

17. The computer-readable non-transitory medium of claim 15, wherein the administrator is identified as an individual person using the anonymously administered node.

18. The computer-readable non-transitory medium of claim 15, wherein the anonymously administered node comprises a client system of the network.

19. The computer-readable non-transitory medium of claim 15, wherein the anonymously administered node comprises a network interface of a software application.

20. The computer-readable non-transitory medium of claim 15, wherein the network is a private network.

* * * * *